(12) United States Patent
Gao

(10) Patent No.: US 6,789,503 B1
(45) Date of Patent: Sep. 14, 2004

(54) AUTOMATIC ANIMAL FEEDING DEVICE

(76) Inventor: De Ping Gao, Lubien Village, Yancuo Town, Longhai City, Fujian (CN)

( * ) Notice: Subject to any disclaimer, the term of this patent is extended or adjusted under 35 U.S.C. 154(b) by 0 days.

(21) Appl. No.: 10/642,975

(22) Filed: Aug. 18, 2003

(51) Int. Cl.⁷ .................................................. A01K 5/02
(52) U.S. Cl. .................................. 119/51.11; 119/57.1
(58) Field of Search ........................... 119/51.11, 56.1, 119/57.1; 222/410, 643, 328

(56) References Cited

U.S. PATENT DOCUMENTS

| | | | | |
|---|---|---|---|---|
| 3,033,164 A | * | 5/1962 | Evers .......................... | 119/54 |
| 4,279,221 A | * | 7/1981 | Arvizu ..................... | 119/51.11 |
| 4,513,688 A | * | 4/1985 | Fassauer .................... | 119/57.1 |
| 4,735,171 A | | 4/1988 | Essex ...................... | 119/51.12 |
| 5,037,014 A | * | 8/1991 | Bliss .......................... | 222/410 |
| 5,078,097 A | * | 1/1992 | Chisholm ................. | 119/51.13 |
| 5,230,300 A | * | 7/1993 | Mezhinsky ............... | 119/51.11 |
| 5,303,672 A | * | 4/1994 | Morris ..................... | 119/51.11 |
| 5,908,007 A | * | 6/1999 | Duin ........................ | 119/51.11 |
| 6,427,628 B1 | * | 8/2002 | Reece ...................... | 119/51.11 |

FOREIGN PATENT DOCUMENTS

GB        2168882 A    *   7/1986   ............ A01K/5/02

* cited by examiner

Primary Examiner—Charles T. Jordan
Assistant Examiner—John W. Zerr
(74) Attorney, Agent, or Firm—Charles E. Baxley

(57) ABSTRACT

An animal feeding device includes a housing having a front opening directed toward a food dish, a paddle device rotatably received in the housing with a shaft and having a number of blades to dispense the food through the opening of the housing and into the food dish when the paddle device is rotated relative to the housing. A motor is coupled to the paddle device to rotate the paddle device to dispense a predetermined quantity of the food into the food dish, preferably in a predetermined time interval by a timer. The paddle device includes a partition extended from the shaft, and perpendicular to the shaft, to separate the blades into two parts.

9 Claims, 5 Drawing Sheets

AUTOMATIC ANIMAL FEEDING DEVICE

BACKGROUND OF THE INVENTION

1. Field of the Invention

The present invention relates to an animal feeding device, and more particularly to an automatic animal feeding device for providing a predetermined quantity of food to feed animals in a predetermined time interval.

2. Description of the Prior Art

Typical animal feeding devices comprise a helical driving member for mixing food, and for providing the food to food dishes or the like. For example, U.S. Pat. No. 4,735,171 to Essex discloses one of the typical animal feeding devices.

However, the helical driving member of the typical animal feeding devices may not be used to precisely provide or feed a predetermined quantity of food to the food dish, because some of the food retained in the helical driving member may have a good chance to flow into the food dish inadvertently.

The present invention has arisen to mitigate and/or obviate the afore-described disadvantages of the conventional animal feeding devices.

SUMMARY OF THE INVENTION

The primary objective of the present invention is to provide an automatic animal feeding device for providing a predetermined quantity of food to feed animals in a predetermined time interval.

In accordance with one aspect of the invention, there is provided an animal feeding device comprising a housing for receiving food for animals, the housing including a front portion having an opening formed therein, and including a food dish attached to the front portion thereof and having a space formed therein and communicating with the opening of the housing to receive the food from the housing, a paddle device rotatably received in the housing with a shaft and including a plurality of blades to dispense the food through the opening of the housing and into the food dish when the paddle device is rotated relative to the housing, and means for rotating the paddle device to dispense a predetermined quantity of the food into the food dish, and preferably in a predetermined time interval, to allow the food to be supplied or dispensed into the food dish automatically without being dispensed by the users themselves.

The blades of the paddle device are extended radially and outwardly from the shaft, to dispense the food into the food dish. The paddle device includes a partition extended radially and outward from the shaft, and perpendicular to the shaft, to separate the blades into two parts.

A casing is further provided and received in the housing and includes an upper passage formed therein to receive the food, and includes a chute having a ramp directed toward the opening of the housing, to direct and dispense the food into the food dish.

The housing includes a mouth provided therein, the feeding device further includes a container to receive the food and having a bottom port engage able into the mouth of the housing, to direct the food from the container into the housing.

The rotating means includes a gear secured on the shaft, a motor coupled to the gear to rotate the shaft via the gear, a first worm secured to the motor, a rod rotatably received in the housing, and a second and a third worms attached to the rod and engaged with the first worm and the gear respectively, to allow the motor to rotate the shaft.

A timer is further provided and received in the housing, to control an operation time of the motor. For example, the housing includes a socket recess formed therein to receive the timer, the timer includes a plurality of switch knobs to adjust the operation time of the motor. The timer includes at least one button provided thereon to operate the timer.

Further objectives and advantages of the present invention will become apparent from a careful reading of the detailed description provided herein below, with appropriate reference to the accompanying drawings.

DETAILED DESCRIPTION OF THE PREFERRED EMBODIMENT

Figure 1:
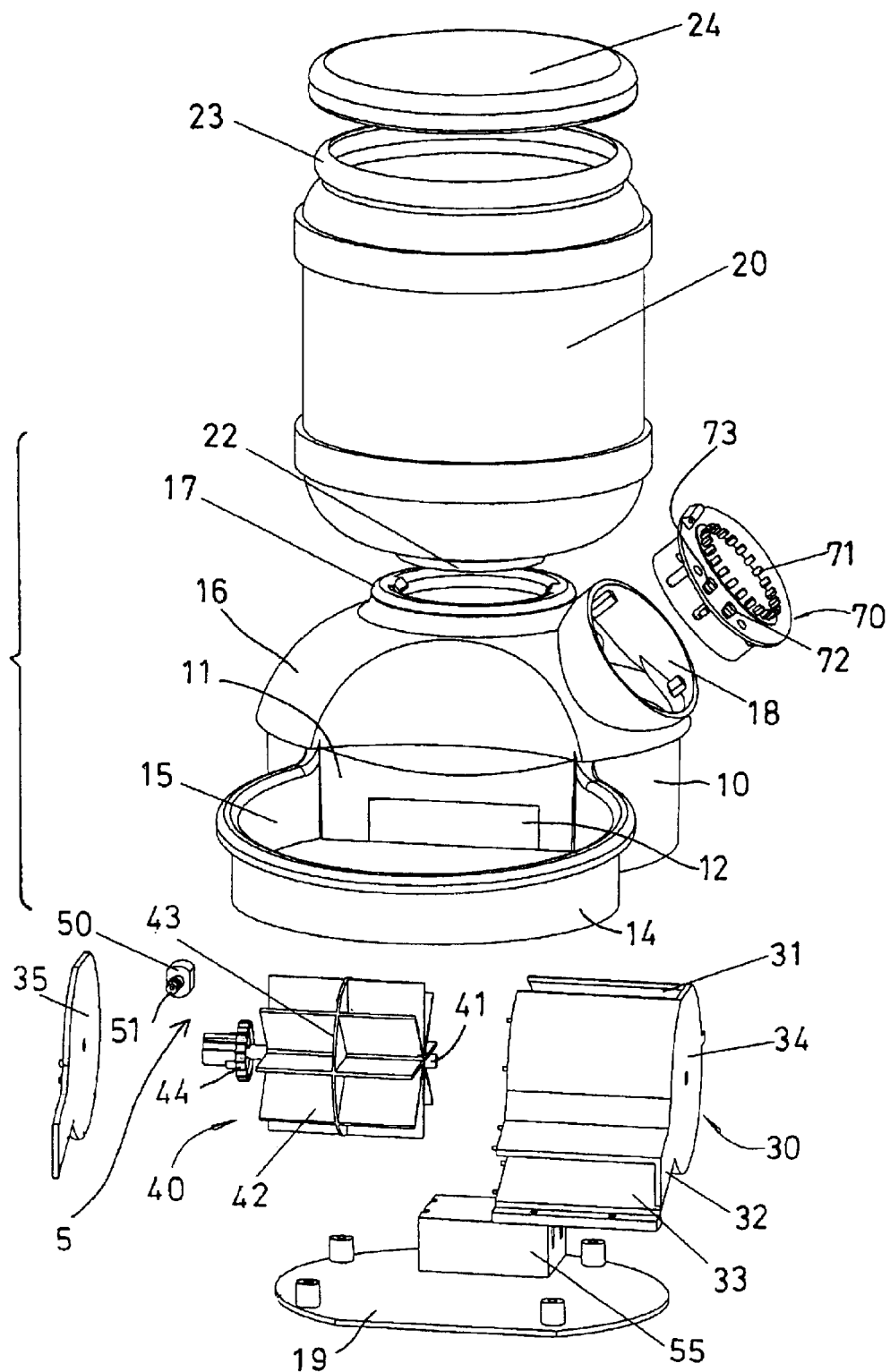
FIG. 1 is an exploded view of an automatic animal feeding device in accordance with the present invention.
Figure 2:
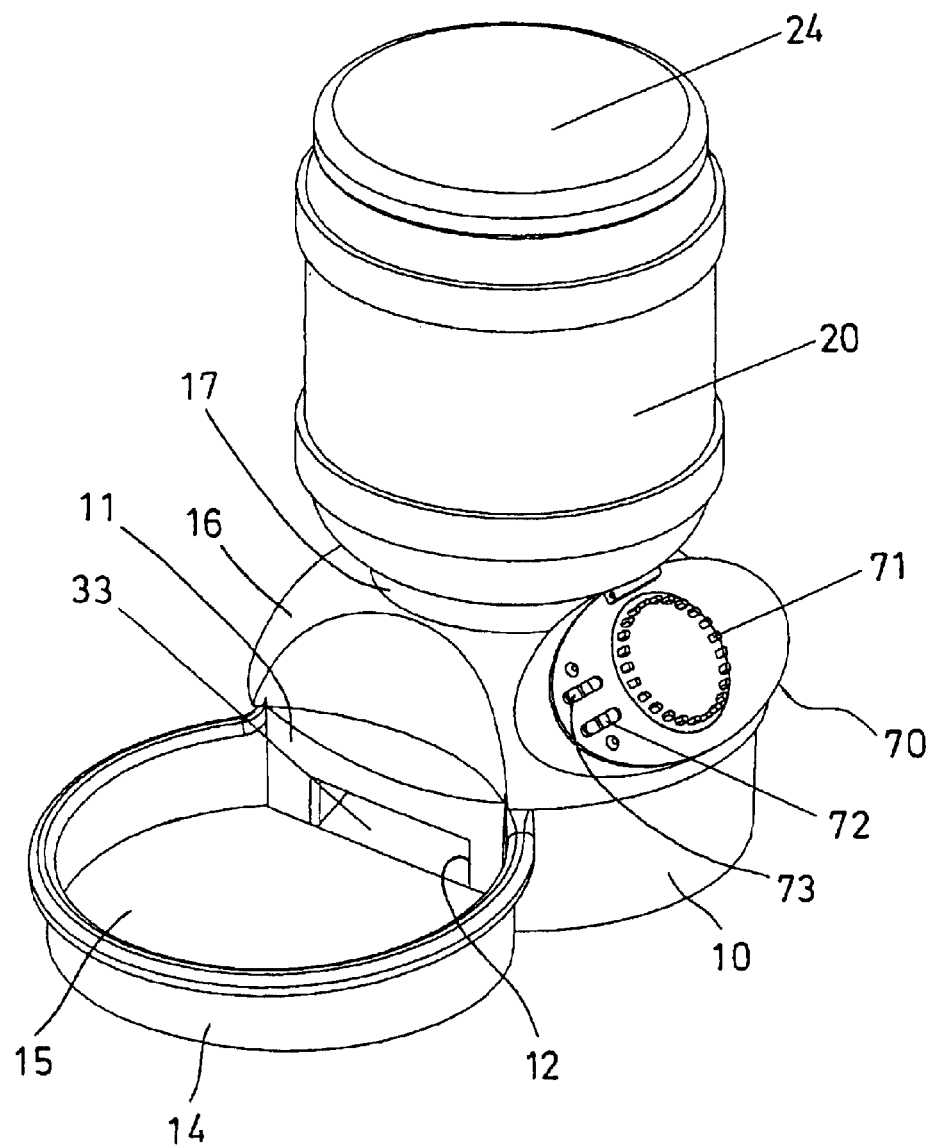
FIG. 2 is a perspective view of an automatic animal feeding device.

Referring to the drawings, and initially to FIGS. 1 and 2, an automatic animal feeding device in accordance with the present invention comprises a housing 10 including a front portion 11 having an opening 12 formed therein, and including a food dish 14 attached to the front portion 11 thereof and having a space 15 formed or provided therein and communicating with the opening 12 of the housing 10 for receiving food for animals.

The housing 10 includes a cover 16 provided or disposed on top thereof and having a mouth 17 and a socket recess 18 formed therein. A cover 19 may be attached or secured to the bottom of the housing 10 for enclosing the bottom of the housing 10, and for retaining various objects or members within the housing 10, which will be described hereinafter.

A container 20 is provided for receiving the food for animals, and includes a port 22 formed or provided in the bottom portion thereof and engage able into the mouth 17 of the housing 10, for allowing the food to flow from the container 20 into the housing 10. The container 20 includes an upper entrance 23 enclosable with a cap 24, for filling the food into the container 20, and thus into the housing 10.

A casing 30 is received in the housing 10, and secured or latched within the housing 10 with fasteners (not shown) or the like, and includes an upper passage 31 formed therein and directed toward or aligned with the port 22 of the container 20 and/or the mouth 17 of the housing 10, for allowing the food from the container 20 and the housing 10 to flow into the casing 30.

Figure 5:
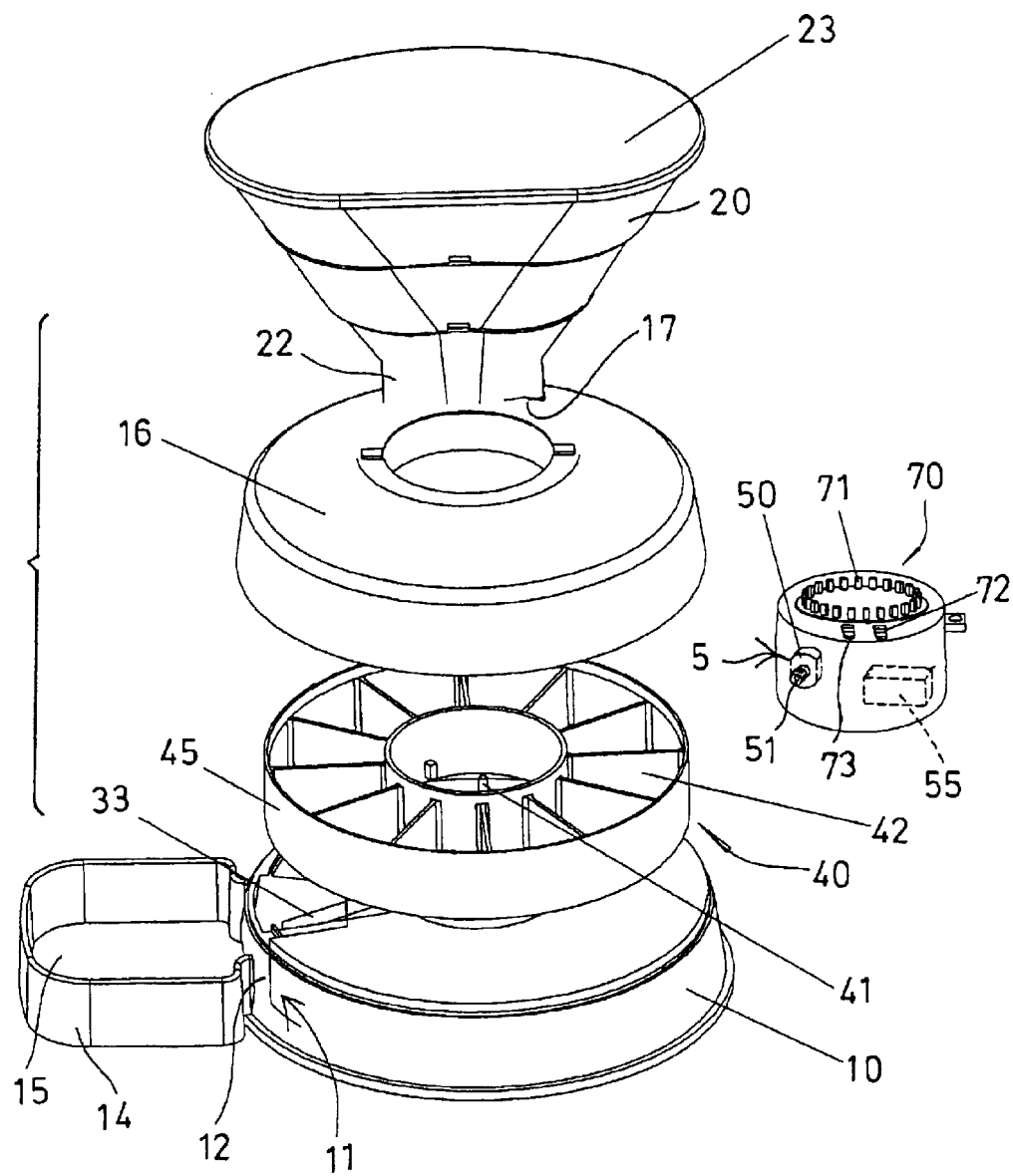
FIG. 5 is an exploded view illustrating the other arrangement of the automatic animal feeding device.
Figure 6:
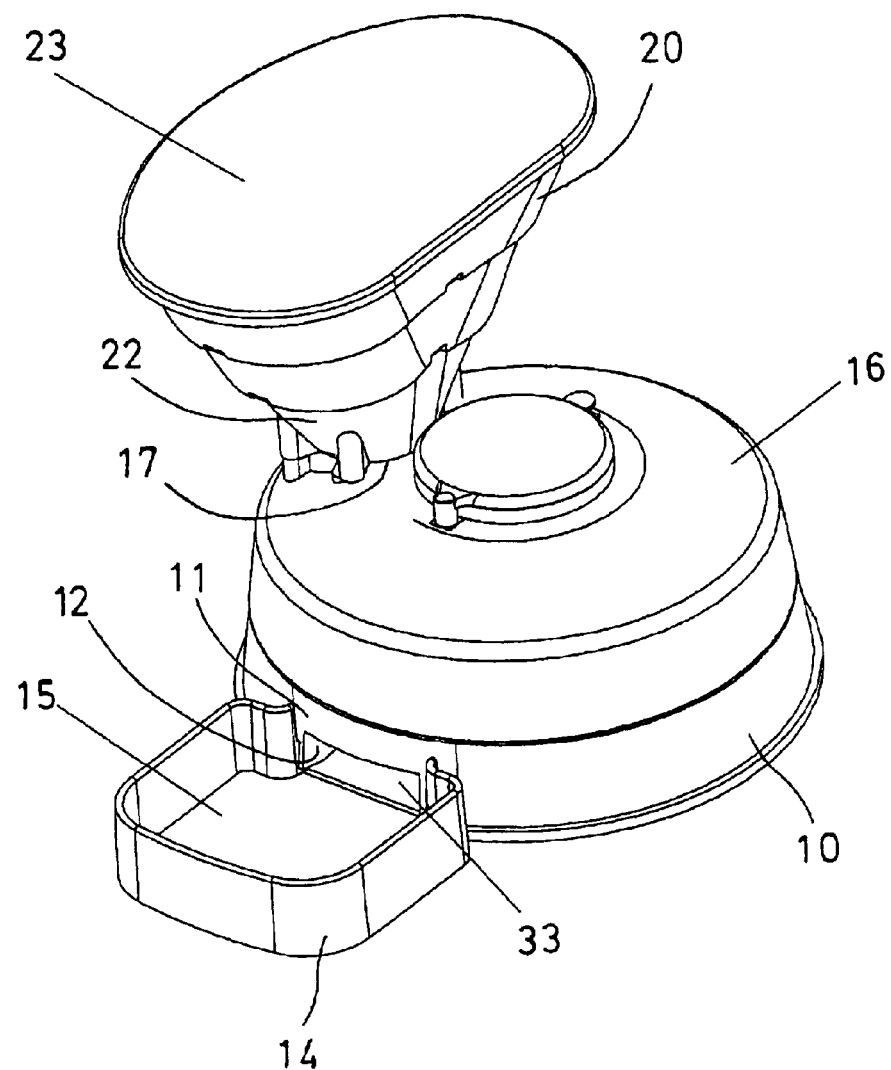
FIG. 6 is a perspective view of the automatic animal feeding device as shown in FIG. 5.

The casing 30 includes a chute 32 having an inclined ramp 33 directed toward the opening 12 of the housing 10 for receiving the food from the container 20 and the housing 10, and for directing the food toward or into the space 15 of the food dish 14 to feed animals. The container 20 may include a funnel shape or structure as shown in FIGS. 5 and 6, for easily receiving the food.

A paddle device 40 is rotatably received in the casing 30 with such as a shaft 41 which may be rotatably secured between two side walls 34, 35 of the casing 30. The paddle device 40 includes a number of blades 42 extended radially and outwardly from the shaft 41 and parallel to the shaft 41, and a partition 43 also extended radially and outwardly from the shaft 41 but perpendicular to the shaft 41.

It is preferable that the outer diameter of the partition 43 is substantially equals to the inner diameter of the casing 30, such that the partition 43 may separate the inner portion of the casing 30 and/or the blades 42 into two separated chambers or two parts. It is also preferable that the blades 42 of the paddle device 40 include a width equals to the outer diameter of the partition 43, such that two different food materials may be separately supplied or dispensed into the food dish 14 by the blades 42 provided on both sides of the partition 43 of the paddle device 40.

Figure 3:
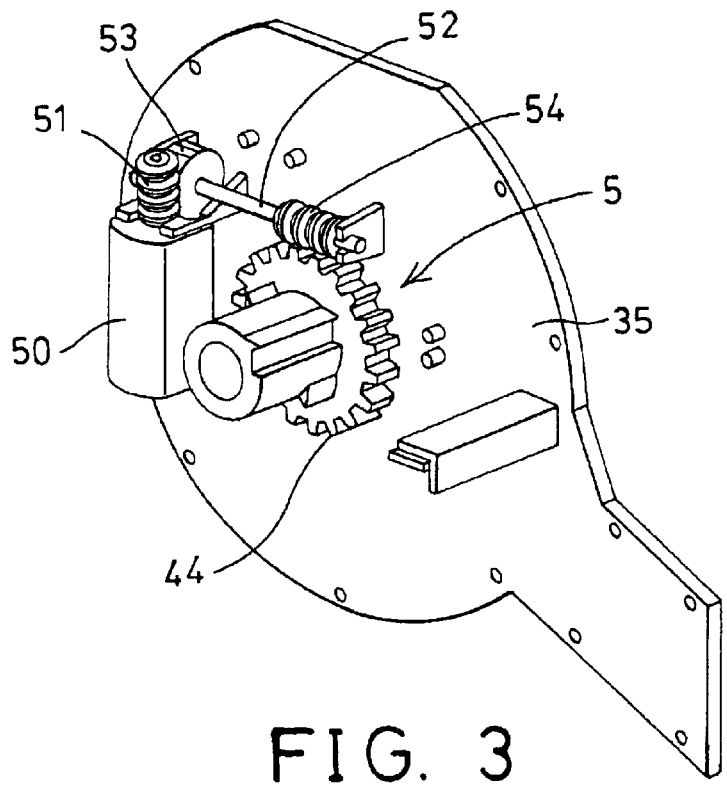
FIG. 3 is a partial perspective view of a transmission or coupling device for the automatic animal feeding device
Figure 4:
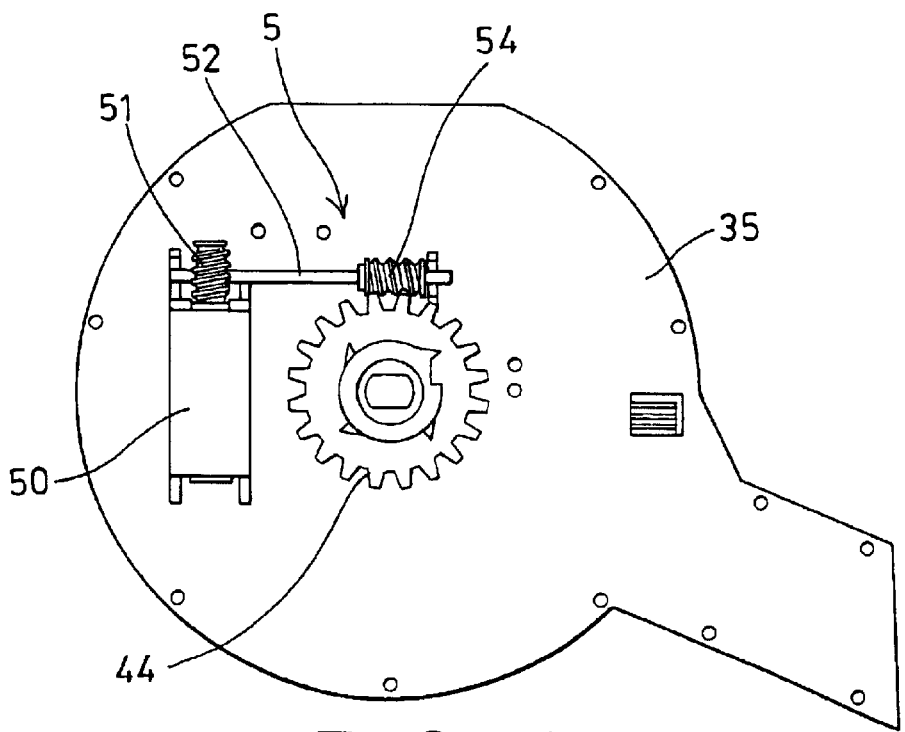
FIG. 4 is a plan schematic view of the transmission or coupling device as shown in FIG. 3.

As shown in FIGS. 1, 3, 4, a transmission device 5 includes a gear 44 secured on the shaft 41 and rotated in concert with the shaft 41, a motor 50 secured to such as the wall 35 of the casing 30, a worm 51 provided or secured to the motor 50, for being rotated or driven by the motor 50, a rod 52 rotatably secured in the casing 30, and two worms 53, 54 secured on the rod 52 and engaged with the worm 51 and the gear 44 respectively, to allow the shaft 44 to be rotated or driven by the motor 50 via the worms 51, 53, 54 and the gear 44 of the transmission device 5.

It is preferable that the motor 50 is a step motor 50 in order to rotate the paddle device 40 step by step, or to rotate the paddle device 40 for a predetermined angle at one time. The angles of the paddle device 40 to be rotated by the motor 50 may be calculated or determined by the number of the blades 42. One or more batteries 55 may be disposed in the casing 30 and coupled to the motor 50, in order to energize or actuate the motor 50.

For example, when the paddle device 40 includes nine (9) blades 42, the included angle between the blades 42 will be forty (40) degrees. Accordingly, it is preferable that the paddle device 40 is arranged to be rotated by the motor 50 for forty (40) degrees each time, such that the food provided or retained between the blades 42 may be supplied into the food dish 14 in a predetermined quantity by the blades 42.

As shown in FIG. 1, the shaft 41 and the blades 42 of the paddle device 40 are arranged horizontally. However, alternatively, as shown in FIG. 5, the shaft 41 and the blades 42 of the paddle device 40 may also be arranged vertically relative to the housing 10, and the paddle device 40 may include an outer peripheral plate 45 disposed or secured around the outer portions of the blades 42.

A timer 70 may be received in the socket recess 18 of the housing 10, and may include a number of switch knobs 71 to adjust or determine the time to actuate or operate or energize the motor 50, and one or more buttons 72, 73 to actuate or operate the timer 70, and/or to determine or adjust the working time interval of the motor 50. The timer 70 may also be received in the middle portion of the housing 10 and/or of the paddle device 40 (FIG. 5).

In operation, the food for the animals may be filled into the container 20. The timer 70 may then be switched to determine the time and/or the time interval to actuate or operate or energize the motor 50. The paddle device 40 may then be rotated or operated by the motor 50 at the selected time and/or the time interval to supply the predetermined quantity of the food to the food dish 14.

Accordingly, the automatic animal feeding device in accordance with the present invention may be used for providing a predetermined quantity of food to feed animals in a predetermined time interval.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An animal feeding device comprising:
   a housing for receiving food for animals, said housing including a front portion having an opening formed therein, and including a food dish attached to said front portion thereof and having a space formed therein and communicating with said opening of said housing to receive the food from said housing,
   a paddle device rotatably received in said housing with a shaft and including a plurality of blades to dispense the food through said opening of said housing and into said food dish when said paddle device is rotated relative to said housing, said paddle device including a partition extended radially and outward from said shaft, and perpendicular to said shaft, to separate said blades into two parts, and
   means for rotating said paddle device to dispense a predetermined quantity of the food into said food dish.

2. The animal feeding device as claimed in claim 1, wherein said blades of said paddle device are extended radially and outwardly from said shaft, to dispense the food into said food dish.

3. The animal feeding device as claimed in claim 1, further comprising a casing received in said housing and including an upper passage formed therein to receive the food, and including a chute having a ramp directed toward said opening of said housing, to direct and dispense the food into said food dish.

4. The animal feeding device as claimed in claim 1, wherein said housing includes a mouth provided therein, said feeding device further includes a container to receive the food and having a bottom port engageable into said mouth of said housing, to direct the food from said container into said housing.

5. The animal feeding device as claimed in claim 1, wherein said rotating means includes a gear secured on said shaft, and a motor coupled to said gear to rotate said shaft via said gear.

6. The animal feeding device as claimed in claim 5 further comprising a timer to control an operation time of said motor.

7. The animal feeding device as claimed in claim 6, includes a socket recess formed therein to receive includes a plurality of switch knobs to adjust the motor.

8. The animal feeding device as claimed in claim includes at least one button provided thereon to operate said timer.

9. An animal feeding device comprising:
   a housing for receiving food for animals, said housing including a front portion having an opening formed therein, and including a food dish attached to said front portion thereof and having a space formed therein and communicating with said opening of said housing to receive the food from said housing,
   a paddle device rotatably received in said housing with a shaft and including a plurality of blades to dispense the food through said opening of said housing and into said food dish when said paddle device is rotated relative to said housing, and means for rotating said paddle device to dispense a predetermined quantity of the food into said food dish, said rotating means including a gear secured on said shaft, and a motor coupled to said gear to rotate said shaft via said gear, and said rotating means including a first worm secured to said motor, a rod rotatably received in a casing, and a second and a third worms attached to said rod and engaged with said first worm and said gear respectively, to allow said motor to rotate said shaft.

* * * * *